US012679420B2

(12) United States Patent
Akella et al.

(10) Patent No.: US 12,679,420 B2
(45) Date of Patent: Jul. 14, 2026

(54) MAINTAINING DISTANCE DURING VEHICLE INTERACTIONS

(71) Applicant: Zoox, Inc., Foster City, CA (US)

(72) Inventors: Abishek Krishna Akella, Pleasanton, CA (US); Genie Kim, Seoul (KR); Seyed Mahdi Shamsi, Daly City, CA (US)

(73) Assignee: Zoox, Inc., Foster City, CA (US)

( * ) Notice: Subject to any disclaimer, the term of this patent is extended or adjusted under 35 U.S.C. 154(b) by 415 days.

(21) Appl. No.: 18/079,541

(22) Filed: Dec. 12, 2022

(65) Prior Publication Data

US 2024/0190473 A1     Jun. 13, 2024

(51) Int. Cl.
   *B60W 60/00*       (2020.01)
   *B60W 30/095*      (2012.01)
(52) U.S. Cl.
   CPC .... *B60W 60/0027* (2020.02); *B60W 30/0956* (2013.01); *B60W 60/0013* (2020.02); *B60W 2554/4041* (2020.02); *B60W 2554/80* (2020.02)
(58) Field of Classification Search
   None
   See application file for complete search history.

(56) References Cited

U.S. PATENT DOCUMENTS 8,554,397 B1   10/2013  Nishinaga et al.
11,433,885 B1 *  9/2022  Beller ................. B60W 30/095

2016/0335892 A1 *  11/2016  Okada .................... G08G 1/164
2019/0308618 A1 *  10/2019  Kondo ............. B60W 30/0953
2021/0046924 A1    2/2021  Caldwell et al.
2021/0053561 A1 *  2/2021  Beller .................... G08G 1/166
2021/0055733 A1 *  2/2021  Beller ................. G05D 1/0088
2021/0370921 A1 *  12/2021  Silva ................ B60W 60/0027

FOREIGN PATENT DOCUMENTS

CN       111391828 A    7/2020
WO      2019169603 A1   9/2019

OTHER PUBLICATIONS

International Search Report and Written Opinion dated Mar. 15, 2024 for PCT Application No. PCT/US2023/081415.

* cited by examiner

*Primary Examiner* — James M McPherson
(74) *Attorney, Agent, or Firm* — EIP US LLP

(57) ABSTRACT

There are provided methods, systems, and computer-readable media for maintain distance during vehicle interactions. The method comprises determining a first path for a vehicle traversing an environment, determining a second path for an object traversing the environment, determining a region of potential collision between the vehicle and the object, determining that one of the vehicle or the object is in or will be in the region of potential collision first, determining a stopping distance for at least the other of the vehicle or the object from a location in the region of potential collision, determining a current distance of at least said other of the vehicle or the object from the location in the region of potential collision, calculating a cost value based at least in part on the stopping distance and the current distance, and controlling the vehicle based at least in part on the cost value.

14 Claims, 8 Drawing Sheets

900

908

914

902    904    906
910    912

916    904    908
914
902    904

MAINTAINING DISTANCE DURING VEHICLE INTERACTIONS

BACKGROUND

A path followed by a vehicle may cross predicted paths of other road users. For example, when travelling along the same road, the paths being followed by the vehicle and another road user may be substantially aligned. Paths may also cross at intersections, or when a vehicle or road user changes lanes on a highway. During these interactions, it is desirable that the vehicle, at least, is controlled so that an appropriate distance is maintained between the vehicle and the other road user, and so that inappropriate behavior, such as tailgating or cutting across the other road user, is minimized.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
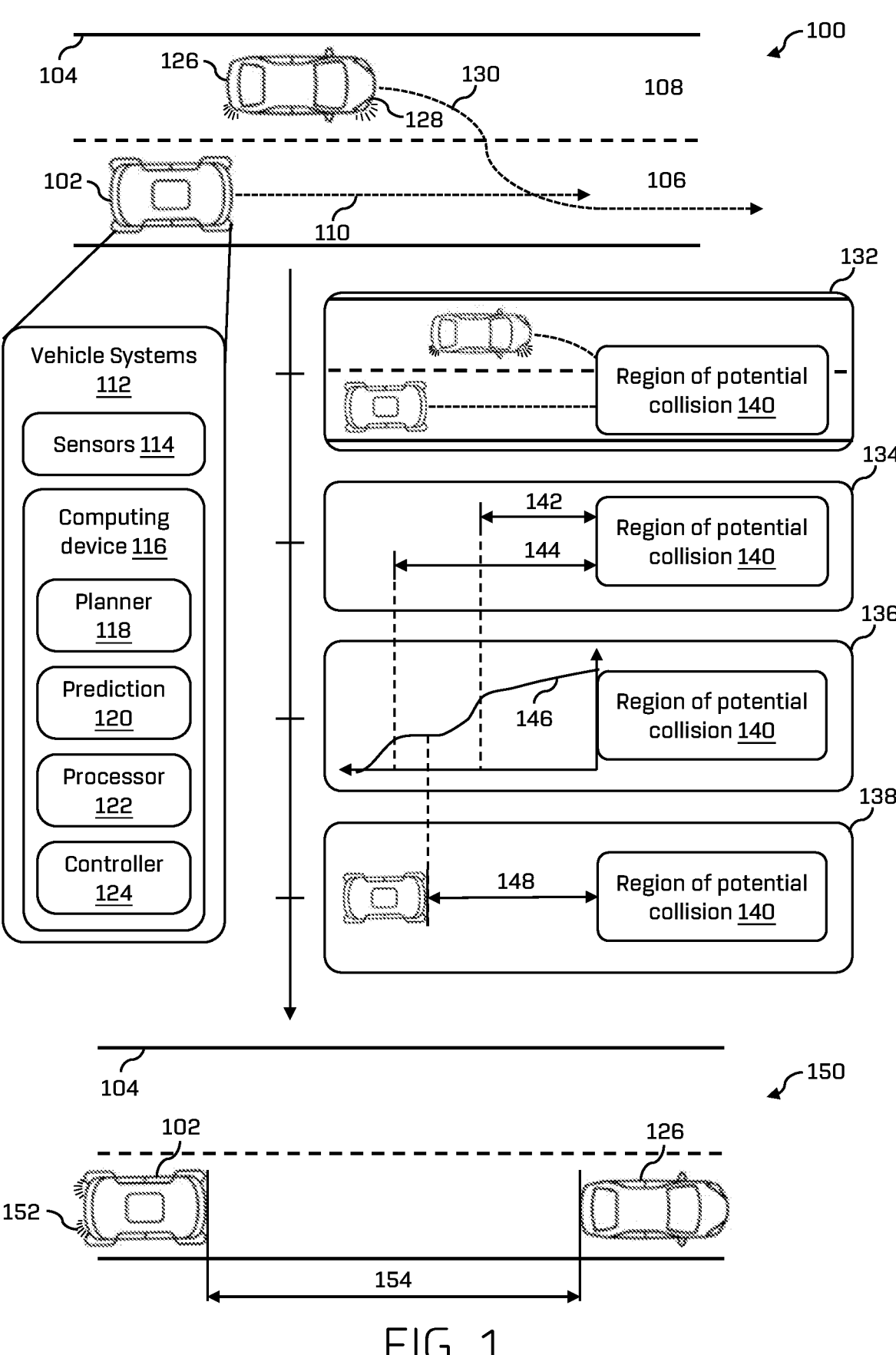
FIG. 1 is a pictorial diagram of a process for maintaining an appropriate stopping distance from an agent vehicle according to the present invention.

This application relates to techniques including methods, systems, and computer-readable media for controlling how a vehicle behaves when its path intersects with a path of another object, which may be referred to as an agent vehicle, an agent, or a road user. The techniques described herein may improve interactions between vehicles and agents as well as reducing the likelihood of collisions or near-collisions. The techniques may better align behavior of autonomous or semi-autonomous vehicles with expected behaviors from road users. The techniques may reduce unwanted or undesirable behaviors such as tailgating. By implementing the techniques, the safety of occupants of the vehicle and of other road users may be prioritized.

When a vehicle is driving along a road, it may interact with one or more agents. A vehicle may interact with an agent when the agent is proximal to the vehicle, i.e., within a predetermined distance from the vehicle. During the interaction, the vehicle may monitor the agent's movements and behavior, and may react accordingly. In some interactions, a path that the agent is expected or predicted to follow may be determined. A part of the path may cross or be close to a path that the vehicle is following. For example, the vehicle may be following the agent, or the agent and vehicle may be driving in adjacent lanes and the agent or vehicle may merge into the other lane. The agent may be oncoming to the vehicle.

During such interactions, there may be an increased possibility of collision or near-collision between the vehicle and the agent, due to the crossing or proximity of the paths. A collision or near-collision may be possible if one of the vehicle or agent performs an unexpected maneuver where the paths cross or come into proximity with one another. For example, where the vehicle is following the agent, the agent may apply the brakes hard so as to come to a sudden stop. As at least part of the agent is in the path of the vehicle, a collision may occur if the vehicle is not able to react sufficiently quickly to the sudden stopping of the agent.

To reduce the possibility of collision, the vehicle may be controlled in such a way that enough space is maintained between the vehicle and the agent for avoidance of or mitigation of a collision should a 'worst-case' action be performed. The worst-case action, which may be referred to as an adversarial action, may be the agent decelerating at a maximum rate and therefore coming to a stop in the path of the vehicle or the vehicle decelerating at a maximum rate and therefore coming to a stop in the path of the agent. In some cases, where the agent may be coming towards the vehicle from the front, the worst-case action may be that the agent continues along its path.

To implement such control, the vehicle or a computing device associated with the vehicle may be configured to predict where a possible collision may occur between the agent and the vehicle for a given scenario. Where the possible collision may take place may be defined by a region, which may also be referred to as a collision zone. A threshold distance to be maintained for either the vehicle or the agent from the region or a position or location within the region may then be determined, and the vehicle can be controlled to ensure that at least the threshold distance is maintained. The threshold distance may represent a closest distance between the vehicle or agent and the region or the position therein to enable the vehicle or agent to stop before the region or the position therein when decelerating at a predetermined deceleration. The predetermined deceleration may be a maximum deceleration or a comfortable or normal deceleration. If the agent or vehicle is closer than the threshold distance, then it may not be able to stop before the region, meaning that a collision may be more likely to occur. The vehicle may be controlled according to the threshold distance. For example, if the vehicle is not a threshold distance from the agent when it is following the agent, the vehicle can be controlled so as to increase the distance between it and the agent. The distance may be increased by decelerating or maintaining a current velocity if the agent is accelerating. If the agent is not a threshold distance from the vehicle, despite the vehicle being expected to cross in front of the agent, the vehicle may be controlled so as to decelerate or change its path to ensure that the agent is able to maintain at least the threshold distance. A threshold distance may be associated with a cost value or score that may be applied to control the vehicle when it is closer to the region than the threshold distance or close to the threshold distance. The cost value may be used to 'penalize' the vehicle, i.e., the vehicle may be controlled to perform actions that reduce the cost value or that have a lower cost value. There may be multiple threshold distances based on different deceleration rates. Each threshold distance of the multiple threshold distances may be associated with a different cost value, such that threshold distances that are closer to the region penalize the vehicle more than threshold distances further away. In some examples, a cost value may be determined based on where the vehicle currently is compared to the threshold distance(s). The cost value may be determined according to a cost function. The cost function may be determined based on the one or more threshold distances. The cost value may be determined by evaluating the cost function for a current distance of the vehicle from the region.

Accordingly, the possibility of collision or near-collision may be reduced and/or undesirable practices or behaviors of the vehicle such as tailgating or cutting in front of an agent too quickly may be reduced. The techniques described herein may also be useful in ensuring that a vehicle is pre-emptively reacting to an agent's actions, so that it is clear to the agent what action the vehicle is taking and the agent can proceed with its own actions.

The region in which a potential collision may occur may be determined based on respective expected paths of the vehicle and agent. The region may comprise one or more locations at which the vehicle and agent may collide when travelling along their respective expected paths. To determine the locations and/or the region, representations of the vehicle and an agent may be projected or mapped along the respective paths. Such techniques are described in U.S. patent application Ser. No. 17/535,396 titled "Prediction Sampling Techniques", which is incorporated by reference in its entirety herein for all purposes. Such projection may be based on planned trajectory information for the vehicle and predicted trajectory information for the agent.

The region may be determined to include locations where the representations of the vehicle and agent touch or at least partially overlap. The region may also include locations where a shortest distance between the representations is below a threshold value, i.e., one representation is within a predetermined distance of the other representation, as this may account for a degree of positional uncertainty. The region may therefore provide an overview of where a worst-case action may occur. In other words, the region may indicate locations where, if either the vehicle and/or agent performs an unexpected maneuver, there is at least a threshold possibility that the vehicle and agent may collide. The region may be determined without regard to parameters such as velocity or acceleration of the vehicle or agent in order to consider as many possible collisions as possible. In doing so, even unlikely actions by the vehicle or agent along their respective paths may be taken into account. In some examples, the region may be based at least in part on at least one of a current velocity of the vehicle or agent, a predetermined deceleration rate of the vehicle or agent, or a reaction time of the vehicle or agent. Utilizing velocity, deceleration, and/or reaction time may improve how precisely the collision region may be determined, and therefore how precisely the vehicle may be controlled in response. A reaction time may vary depending on whether the agent is being controlled autonomously or manually. This may be taken into account when determining the region. In some examples, the region may be determined based on a worst-case action for the particular scenario. The worst-case action may be determined based on at least one of a direction of travel of the vehicle relative to the agent, a velocity of the vehicle and/or agent, an acceleration of the vehicle and/or agent, an environmental condition, a category of vehicle of the agent, a behavior profile of the agent, or other road conditions or factors exterior to the vehicle and agent.

Having determined the region of potential collision, one or more threshold distances may be determined from the region or a location in the region. A threshold distance may be referred to as a collision distance, a stopping distance, or a stop margin. A stopping distance may represent a closest distance to a location within the region of potential collision, at which the vehicle or the agent would be able to stop without reaching the region or the location. In at least some examples, such a stopping distance may be dependent on the type of vehicle (e.g., as may be determined by a detection component associated with the perception system) and/or a type of control of the vehicle (e.g., whether autonomously controlled, manually, or otherwise). As a non-limiting example of the above, a greater stopping distance may be provided for a tractor trailer as opposed to a sedan.

The stopping distance may be determined based on a maximum deceleration by the vehicle or the agent. Additionally or alternatively, a stopping distance may be determined based on a deceleration of the vehicle or agent that is less than a maximum deceleration. This deceleration may be a 'comfortable' deceleration, i.e., a deceleration that would be comfortable to the passengers within the vehicle or agent.

The stopping distance may be determined for the vehicle and/or for the agent. In some examples, a stopping distance may be determined for the vehicle and for the agent. The stopping distance may be determined from a different location within the region for each of the vehicle and the agent. In some examples, for which of the vehicle or agent the stopping distance is determined may be dependent on which of the vehicle or agent is predicted to reach the region first or which of the vehicle or agent is already in the region. If the vehicle is predicted to reach the region of potential collision first or is already in the region, then the stopping distance may be determined for the agent. This may allow the vehicle to determine whether the agent would be able to stop if the vehicle stops suddenly in the region, and to act accordingly. If the agent is predicted to reach the region of potential collision first or is already in the region, then the stopping distance may be determined for the vehicle. This may allow the vehicle to determine if it has sufficient distance to stop in time if the agent were to brake suddenly so that it stops in the region. Whether the vehicle or agent is in the region may be determined by comparing the region with current locations of the vehicle and agent.

Whether the vehicle or agent is predicted to arrive in the region first may be determined based on trajectory information. A first trajectory may be determined for the vehicle. The first trajectory may include the first path. The first trajectory and/or the first path may be received from a planning component of the vehicle. A second trajectory may be determined for the agent. The second trajectory may include the second path. The second trajectory and/or the second path may be received from a prediction component of the vehicle.

The stopping distance may be based on at least one of: a current velocity of the agent or vehicle; a current acceleration of the agent or vehicle; a potential deceleration of the agent or vehicle; a weather condition; a road surface; a tire condition; or a vehicle type. In some examples, the stopping distance may be based on the path that the agent or vehicle is expected to follow. The stopping distance may be a distance along the path. The stopping distance may indicate a position on the path.

A current distance of the vehicle or agent from the region or a location therein may also be determined, the current distance being the actual distance of the vehicle or agent from the region or location at the current time. While the stopping distance may be a calculated distance, representing a limit or threshold or to be used as the basis for determining a cost function, the current distance may be considered as a measured distance, representing an actual value for comparison with the limit, threshold, or cost function. The current distance may be determined based on sensor data determined by the vehicle. Sensor data may be used to determine a current location of the vehicle or agent, and a distance along the path to be followed by the vehicle or agent to the region of potential collision may be determined.

How the current and stopping distances are determined may depend on where the vehicle and agent are relative to the region of potential collision. If both the agent and vehicle are outside the region of potential collision, the current and stopping distances may be determined from a location on an edge of the region of potential collision. The edge may be an edge closest to the agent or vehicle. The location may be where the path followed by the agent or vehicle first intersects with the region. This accounts for positional uncertainty of the agent and vehicle into the future, therefore taking account of any potential collisions or worst-case actions. If the agent or vehicle is within the region of potential collision, then the current and stopping distances may be determined from a location within the region that is currently occupied by the vehicle or agent, or from a location that may be occupied by the vehicle or agent in the near future. This is because there is less positional uncertainty once the vehicle or agent is in the region, so the vehicle may be controlled with greater precision. The location may be a location on an edge of the vehicle or agent facing the other of the vehicle or agent. For example, the edge may be the rear of the agent if the vehicle is following the agent. The location may be on a path of the other of the vehicle or agent.

The vehicle may be controlled based on the current and stopping distances. The current distance may be compared to the stopping distance. If the current distance is less than the stopping distance and the current distance and stopping distance are determined for the vehicle, then the vehicle may be controlled to increase the current distance or to decrease the stopping distance. This may be achieved by controlling the vehicle to decelerate or by controlling the vehicle to change its path to an alternate path for which the current distance is greater than the stopping distance. If the current distance is less than the stopping distance and the current distance and stopping distance are determined for the agent, then the vehicle may be controlled to either avoid the region of potential collision or to change its trajectory or path so that the current distance of the agent is greater than the stopping distance. In some examples, the vehicle may be controlled to emit a warning signal to the agent. In some examples, the vehicle may be controlled to continue monitoring the agent.

In order to control the vehicle, a cost value may be determined. A cost may enable control of the vehicle based on the current and stopping distances regardless of which of the vehicle or agent the current and stopping distances have been determined for. To determine a cost value, the current distance may be compared to the stopping distance. If the current distance is less than the stopping distance, then the cost value may have a first value, whereas if the current distance is greater than the stopping distance, then the cost value may have a second value. The first value may indicate to the vehicle that it should perform evasive action, while the second value may indicate no evasive action. Alternatively, a cost function may be determined based on the stopping distance. The cost function may be a function of distance from the region of potential collision. The cost function may indicate a plurality of cost values for respective distances from the region of potential collision. The current distance may be used to determine a cost value based on the cost function. The vehicle may be controlled to reduce the cost value towards zero, or to reduce the cost value if it exceeds a threshold value. The cost value may be combined with other cost values from other determinations or methods, and an integrated cost may be used to control the vehicle.

The above techniques may be applied when the vehicle is following an agent, when an agent is following the vehicle, when the paths of the vehicle and agent cross, such as at an intersection or during merging between two lanes, or when the agent and vehicle are approaching one another. In the scenario where the agent and vehicle are approaching, i.e., the agent is oncoming towards the vehicle, the worst-case action may be considered as the agent continues to drive towards the vehicle. An agent and vehicle may be considered to be oncoming where the headings of the vehicle are in opposite or substantially opposite directions. Accordingly, the stopping distance and current distance may be determined based on a location in the region that corresponds to this worst-case action. In some examples, the location may be or may be based on a position at which the path predicted for the agent exits the region of potential collision. The location may be or may be based at least in part on a stopping distance determined for the agent. In other words, a stopping distance may be determined for both the agent and the vehicle. The stopping distance for the agent may be used with the location at which the path exits the region to determine an intermediate point from which the stopping distance for the vehicle may be determined. The location may be based at least in part on a degree of alignment between the paths or headings of the agent and vehicle. In some examples, a predicted lateral velocity for the agent may be determined. The predicted lateral velocity may be a worst-case velocity that allows the agent to swerve out of the way of the vehicle. The predicted lateral velocity may be used to determine the location from which the stopping distance is determined. The location may be a location at which, when travelling at the predicted lateral velocity, the agent is no longer oncoming.

FIGS. 1 to 9B are provided to illustrate embodiments of the invention and examples in which embodiments may be implemented. FIG. 1 provides an overview of a scenario 100 in which a vehicle 102 is travelling along a road 104, only a portion of which is shown in FIG. 1. The road 104 has two lanes: a right-hand lane 106 and a left-hand lane 108. The vehicle 102 is travelling in the right-hand lane 106. The vehicle 102 is travelling from left to right, along a path 110.

The vehicle 102 may be an autonomous vehicle. The vehicle 102 may include one or more vehicle systems 112. The vehicle systems 112 may include one or more sensors 114. The sensors 114 may be configured to sense the environment surrounding the vehicle 102. The vehicle systems 112 may also include a computing device 116. The computing device 116 may include a planner 118, a prediction component 120, a processor 122, and a controller 124. An example vehicle and vehicle system are discussed in more detail in relation to FIG. 2 below.

The vehicle 102 may use its sensors 114 and the planner 118 to determine the path 110. The path 110 may be part of a trajectory determined by the planner 118. The path may indicate where the vehicle 102 is going to travel. The trajectory may, in addition to the path, also indicate a speed at which the vehicle 102 is to travel along the path or other temporal information such as one or more times at which waypoints along the path 110 are to be reached. In other words, the trajectory 110 may represent a vector or a collection of vectors. In FIG. 1, the path 110 indicates that the vehicle 102 will travel straight, along the road 104 in the right-hand lane 106. The controller 124 may control one or more drive systems of the vehicle to drive the vehicle 102 along the path 110.

In the scenario 100, another vehicle, which will be referred to as an agent 126, is depicted. Road users other than the vehicle being controlled may generally be referred to as agents. The agent 126 is travelling in the left-hand lane 108, and is also travelling from left to right in the orientation shown in FIG. 1. One or more indicator lights 128 of the agent 126 may be flashing, indicating that the agent 126 intends or wishes to merge into the right-hand lane 106.

The vehicle 102 may be configured to determine a path 130 for the agent 126. The path 130 will be referred to as the agent path 130 to distinguish from path 110. The agent path 130 may be determined based on sensor data gathered by the one or more sensors 114 and relating to the agent 126. The agent path 130 may be determined by the prediction component 120 of the vehicle computing device 116. The agent path 130 may be part of an agent trajectory determined by the prediction component 120. In FIG. 1, the agent path 130 crosses into the right-hand lane in front of the vehicle 102. The agent path 130 crosses the vehicle path 110.

The vehicle 102 may be configured to perform a method according to techniques described herein to ensure that a suitable stopping distance will be maintained between it and the agent 126. In scenario 100, the agent path 130 may bring the agent 126 in front of the vehicle 102 in the right-hand lane 106. When the agent 126 enters the right-hand lane 106, the vehicle 102 may be close to the side or rear of the agent 126. If the agent 126 were to perform a sudden deceleration while the vehicle 102 were too close, then a collision may occur because the vehicle 102 may be unable to stop quickly enough to avoid the agent 126. Therefore, the vehicle 102 may be controlled to account for this, and therefore increase a distance between it and where the agent 126 is expected to drive. This may be considered to be taking account for a potential worst-case scenario or action by the agent 126, which in this case is the agent 126 decelerating at a maximum deceleration while at least part of the agent 126 is in the path of the vehicle 102.

In order to implement the control described above, the vehicle 102 performs a method as pictorially represented in boxes 132 to 138 of FIG. 1. As shown in box 132, a region of potential collision 140 between the vehicle 102 and the agent 126 may be determined. The region of potential collision 140 may be determined based on overlaps between projected representations of the vehicle 102 and agent 126 along their respective paths 110, 130. The representations may be projected without consideration for temporal information. An example of how the region of potential collision 140 may be determined is described in more detail below in relation to FIG. 4.

The region of potential collision 140 may represent a set of locations at which a collision may occur. A collision may occur in this region if one of the agent or vehicle performs a worst-case action. Accordingly, the region also represents an area that the other of the agent or vehicle can stop in advance of from its current position, in order to avoid the potential collision.

As shown in box 134, after determining the region of potential collision 140, one or more stopping distances 142,

144 may be determined. One of the stopping distances 142 may be a minimum stopping distance. The minimum stopping distance 142, which may also be referred to as a 'safe' stopping distance or a threshold distance, may be the minimum distance, between the region of potential collision 140 and the vehicle or agent, that is needed in order to be able to apply maximum deceleration and stop before the region of potential collision 140. One or more further stopping distances may be determined in addition to the minimum stopping distance 142, such as stopping distance 144 which may be determined based on the vehicle 102 or agent 126 slowing down using a different deceleration which is less than the maximum deceleration used for the minimum stopping distance 142.

The stopping distances 142, 144 may be determined based on a current velocity of the vehicle or agent and a deceleration value for the vehicle or agent. In some examples, other parameters related to braking performance may be used to determine a stopping distance, such as condition of one or more components, road surface type or condition, weather conditions, and/or current acceleration of the vehicle or agent. In some examples, the stopping distance may be based on a reaction time for the agent or vehicle.

In some examples, having determined a region of potential collision 140, stopping distances such as 142 and 144 may be determined for both the vehicle 102 and the agent 126. The steps 136 and 138 may be performed for both the vehicle 102 and the agent 126. In some examples, one of the vehicle 102 or agent 126 may be selected and the stopping distances for the selected one of the vehicle or agent may be used to perform steps 136 and 138. One or both of the vehicle 102 or agent 126 may be selected based on one or more factors. The selection may be based on which of the vehicle 102 or agent 126 is predicted to or has reached the region of potential collision 140 first. If the vehicle 102 is predicted to reach the region first, then steps 136 and 138 may be performed for the agent 126, using the stopping distances for the agent. If the agent 126 is predicted to reach the region first, then steps 1368 and 138 may be performed for the vehicle 102, using the stopping distances for the vehicle. In some examples, if the vehicle 102 and agent 126 are predicted to reach the region at similar times, i.e., within a predetermined time difference, then steps 136 and 138 may be performed for both the vehicle 102 and the agent 126. In some examples, such a selection may be performed based on relative alignment of the vehicle and agent or a direction of travel of the vehicle relative to the agent. In some examples, the vehicle and agent may be heading towards one another, and based on such a determination steps 136 and 138 may be performed for both the agent and vehicle. In other examples, selection may be based on one or more environmental conditions, vehicle conditions, or whether the agent is determined to be a vehicle that is being controlled autonomously, semi-autonomously, or by a human operator. In at least some examples, a form of hysteresis may be employed to ensure consistency of cost determination (e.g., such that the cost is consistently determined based on the vehicle or the object) for a period of time.

In the example of FIG. 1, the agent 126 is predicted to reach the region 140 first, so steps 136 and 138 are performed for the vehicle 102, and references to stopping distances 142 and 144 below are to stopping distances for the vehicle 102.

As shown in box 136, a cost function 146 may be determined based on the stopping distances 142, 144. The cost function 146 may indicate a cost value associated with particular distances from the region of potential collision. As indicated by the dotted lines for each of the stopping distances 142, 144, the cost function 146 may correspond to the stopping distances 142, 144. Particular cost values may be associated with the stopping distances. The cost values may increase with increasing proximity to the region of potential collision 140. A higher cost value may represent a higher possibility of collision, and may indicate to the vehicle 102 that it needs to increase the distance to the region of potential collision in order to reduce the cost value and/or to avoid the region of potential collision 140 altogether. The cost function will be discussed in more detail below in relation to FIG. 6.

As illustrated in box 138, a current distance 148 of the vehicle 102 from the region of potential collision 140 may be determined. The current distance may also be referred to as a proximity of the vehicle 102 to the region of potential collision 140. The current distance 148 may be used to evaluate the cost function 146 to determine a cost value associated with the current distance 148. The vehicle 102 may then be controlled according to the cost value associated with the current distance 148. The vehicle 102 may be controlled to other cost values, as well as or in addition to the cost value determined in the process shown in FIG. 1.

As illustrated in scenario 150, the vehicle 102 may decelerate by applying the brakes, illustrated in FIG. 1 by the illumination of brake lights 152, in order to increase the distance 154 between the vehicle and the agent 126 to a distance corresponding to a lower cost value. In other examples, the vehicle 102 may have changed lanes to lane 108 to reduce any region of collision between the vehicle 102 and the agent 126. If the agent 126 is determined to be accelerating away from the vehicle 102, the vehicle 102 may maintain its current speed in order to increase the distance between it and the agent.

Figure 2:
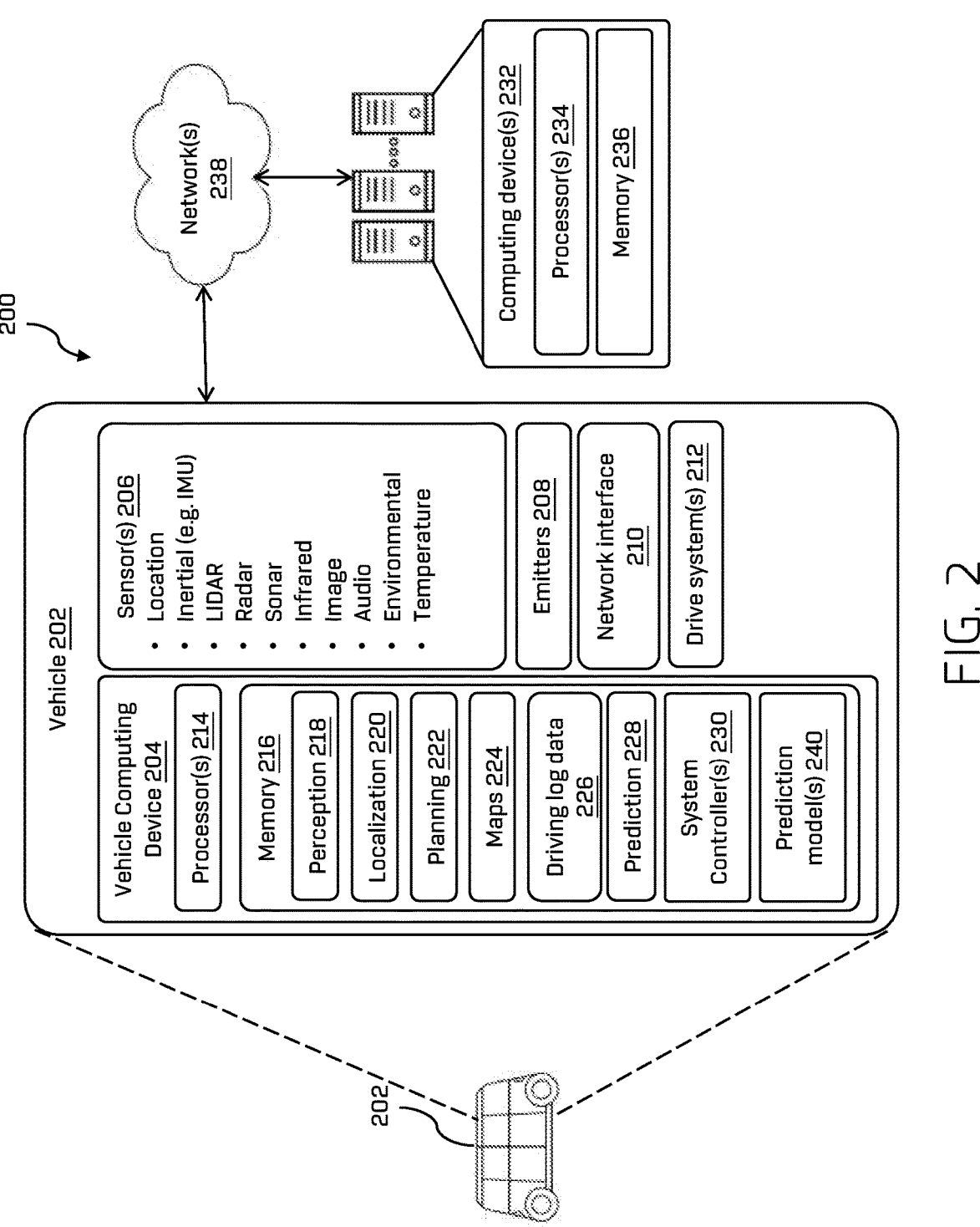
FIG. 2 is a block diagram illustrating an example vehicle system according to the present invention.

Example vehicle systems, such as vehicle systems 112, are shown and described below in more detail in relation to FIG. 2. FIG. 2 illustrates a block diagram of an example system 200 that implements the techniques discussed herein. FIG. 2 may correspond to vehicle systems 112 of FIG. 1. In some instances, the example system 200 may include a vehicle 202, which may correspond to the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification.

The vehicle 202 may include a vehicle computing device(s) 204, sensor(s) 206, emitter(s) 208, network interface(s) 210, and/or drive system(s) 212. Sensor(s) 206 may represent sensor(s) 112. The system 200 may additionally or alternatively comprise computing device(s) 232. The vehicle computing device 204 may be configured to perform the method 300 of FIG. 3 described below.

In some instances, the sensor(s) 206 may correspond to sensor(s) 114 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 232.

The vehicle 202 may also include emitter(s) 208 for emitting light and/or sound, such as brake lights 152. The emitter(s) 208 may include interior audio and visual emitter(s) to communicate with passengers of the vehicle 202. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). The network interface(s) 210 may facilitate communication with other local computing device(s) on the vehicle 202 and/or the drive component(s) 212. The network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 232 over a network 238. In some examples, computing device(s) 232 may comprise one or more nodes of a distributed computing system (e.g., a cloud computing architecture).

The vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 214 and memory 216 communicatively coupled with the one or more processors 214. Computing device(s) 232 may also include processor(s) 234, and/or memory 236. The processor(s) 214 and/or 234 may be any suitable processor capable of executing instructions to process data and perform operations as described herein. By way of example and not limitation, the processor(s) 214 and/or 234 may comprise one or more central processing units (CPUs), graphics processing units (GPUS), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 216 and/or 236 may be examples of non-transitory computer-readable media. The memory 216 and/or 236 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 216 and/or memory 236 may store a perception component 218, localization component 220, planning component 222, map(s) 224, driving log data 226, prediction component 228, and/or system controller(s) 230—zero or more portions of any of which may be hardware, such as GPU(s), CPU(s), and/or other processing units.

The perception component 218 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or or acceleration associated with an object), and/or the like. Data determined by the perception component 218 is referred to as perception data. The perception component 218 may be configured to associate a bounding region (or other indication) with an identified object. The perception component 218 may be configured to associate a confidence score associated with a classification of the identified object with an identified object. In some examples, objects, when rendered via a display, can be colored based on their perceived class. The object classifications determined by the perception component 218 may distinguish between different object types such as, for example, a passenger vehicle, a pedestrian, a bicyclist, motorist, a delivery truck, a semi-truck, traffic signage, and/or the like.

In at least one example, the localization component 220 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 220 may include and/or request/receive map(s) 224 of an environment and can continuously determine a location, velocity, and/or orientation of the autonomous vehicle 202 within the map(s) 224. In some instances, the localization component 220 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 220 may provide data to various components of the vehicle 202 to determine an initial position of an autonomous vehicle for generating a trajectory and/or for generating map data, as discussed herein. In some examples, localization component 220 may provide, to the perception component 218, a location and/or orientation of the vehicle 202 relative to the environment and/or sensor data associated therewith.

The planning component 222 may receive a location and/or orientation of the vehicle 202 from the localization component 220 and/or perception data from the perception component 218 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 230 and/or drive component(s) 212 may parse/cause to be carried out, second instructions for the emitter(s) 208 may be formatted according to a second format associated therewith).

The driving log data 226 may comprise sensor data and perception data collected or determined by the vehicle 202 (e.g., by the perception component 218), as well as any other message generated and or sent by the vehicle 202 during operation including, but not limited to, control messages, error messages, etc. In some examples, the vehicle 202 may transmit the driving log data 226 to the computing device(s) 232. In some examples, the driving log data 226 may comprise (historical) perception data that was generated on the vehicle 202 during operation of the vehicle.

The prediction component 228 may generate one or more probability maps representing prediction probabilities of possible locations of one or more objects in an environment. For example, the prediction component 228 may generate one or more probability maps for vehicles, pedestrians, animals, and the like within a threshold distance from the vehicle 202. In some examples, the prediction component 228 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 222 may be communicatively coupled to the prediction component 228 to generate predicted trajectories of objects in an environment. For example, the prediction component 228 may generate one or more predicted trajectories for objects within a threshold distance from the vehicle 202. In some examples, the prediction component 228 may measure a trace of an object and generate a trajectory for the object based on observed and predicted behavior. Although prediction component 228 is shown on a vehicle 202 in this example, the prediction component 228 may also be provided elsewhere, such as in a remote computing device. In some examples, a prediction component may be provided at both a vehicle and a remote computing device. These components may be configured to operate according to the same or a similar algorithm.

The memory 216 and/or 236 may additionally or alternatively store a mapping system, a planning system, a ride management system, etc. Although perception component 218 and/or planning component 222 are illustrated as being stored in memory 216, perception component 218 and/or planning component 222 may include processor-executable instructions, machine-learned model(s) (e.g., a neural network), and/or hardware.

The memory 216 may store one or more prediction models 240 that may be used for trajectory determination or, as described herein, determining turning intention of person-wide vehicles. The one or more prediction models 240 may include, for example, model 140 of FIG. 1.

As described herein, the localization component 220, the perception component 218, the planning component 222, the prediction component 228, the prediction model(s) 240 and/or other components of the system 200 may comprise one or more ML models. For example, the localization component 220, the perception component 218, the planning component 222, the prediction component 228 and/or the prediction model(s) 240 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., sec U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 230, which may be configured to control steering, propulsion, braking, safety, emitters, communication, and other systems of the vehicle 202. These system controller(s) 230 may communicate with and/or control corresponding systems of the drive component(s) 212 and/or other components of the vehicle 202.

It should be noted that while FIG. 2 is illustrated as a distributed system, in alternative examples, components of the vehicle 202 may be associated with the computing device(s) 232 and/or components of the computing device(s) 232 may be associated with the vehicle 202. That is, the vehicle 202 may perform one or more of the functions associated with the computing device(s) 232, and vice versa.

Figure 3:
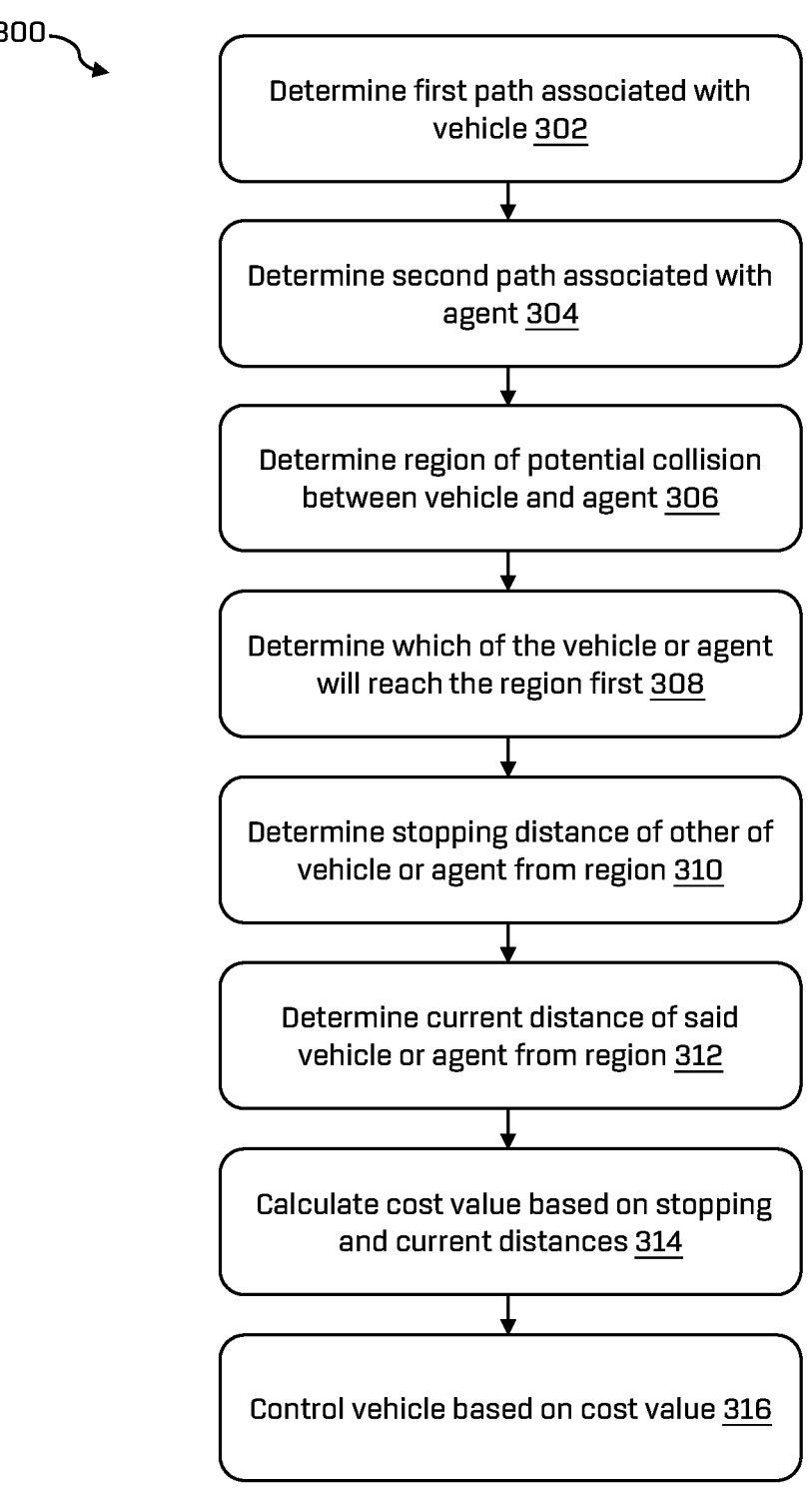
FIG. 3 depicts a flow chart of a process for maintaining an appropriate stopping distance from an agent vehicle according to the present invention.

What is described in FIG. 1 may be depicted as a flow chart. FIG. 3 provides an exemplary flow chart that describes a generalized method 300. The method 300 may be performed by an autonomous vehicle, such as vehicle 102 or 202.

In FIG. 3, the method 300 may comprise, at step 302, determining a first path associated with a vehicle. For example, a path 110 may be determined for vehicle 102. The vehicle for which the first path is determined may be traversing an environment. The first path may indicate where the vehicle is expected or predicted to travel. The first path may be determined by a planner component of the vehicle, such as planner 118 of vehicle 102, and the vehicle may be being controlled according to the first path. The first path may be part of a planned trajectory that indicates expected movements of the vehicle up to a predetermined time in the future.

At step 304, the method 300 may comprise determining a second path associated with an object or agent, which may be a vehicle that is different to the vehicle for which the first path is determined in step 302. The agent may be a vehicle such as agent 126, and the second path may be path 130. The agent may be traversing the environment. The second path may indicate where the agent is expected or predicted to travel. The second path may be determined by a prediction component of the vehicle such as prediction component 120 of vehicle 102. The second path may be part of a predicted trajectory of the agent that predicts movements of the agent up to a predetermined time in the future.

At step 306, a region or area of potential collision between the vehicle and the agent may be determined, such as the region 140 in FIG. 1. The region of potential collision, as will be described in relation to FIG. 4 below, may be determined based on the first and second paths. The region of potential collision may represent one or more locations at which the vehicle and the agent may come into contact or be within a predetermined distance from one another along their respective paths. The region of potential collision may be determined based on the paths but without regard for the current velocity or other parameters of the vehicle or agent. The region of potential collision may be dependent upon a worst-case action or an adversarial action for the particular scenario.

At step 308, the method 300 may comprise determining which of the agent or vehicle is in or will be in the region of potential collision first. Trajectory data may be determined for the agent and vehicle, and based on the trajectory data it may be determined that one of the agent or vehicle may arrive at the region first. In some examples, it may be determined that one of the vehicle and the agent are already in the region. Determining which of the vehicle or agent is in or will be in the region first enables determination of which of the vehicle or agent may be expected to yield and/or determination of which of the vehicle or agent may perform the worst-case action in the particular scenario.

At step 310, a stopping distance of at least one of the vehicle or the agent from the region of potential collision may be determined. The at least one of the vehicle or the agent may be the other of the vehicle or the agent to that which is determined in step 308. In other words, if the vehicle is determined to be in or will be in the region first, the 'other' is the agent, and the stopping distance is determined for the agent. In some examples, a stopping distance may be determined for each of the vehicle and the agent. In some examples, step 310 may be performed before or at the same time as step 308. The stopping distance may be determined from a location or point on an edge of the region or from a location within the region. The stopping distance may be a distance after which the vehicle or agent may not be able to stop before the region of potential collision. The stopping distance may be a distance before which the vehicle or agent will be able to stop before the region of potential collision if it brakes at a predetermined deceleration. The deceleration may be a maximum deceleration. The stopping distance may represent a minimum distance that should preferably be maintained by the agent or vehicle to reduce the possibility of a potential collision in the region. The stopping distance may be determined for one of the vehicle or the agent based on the other of the vehicle or agent being predicted to arrive in the region of potential collision first or the other of the vehicle or agent already being in the region of potential collision.

At step 312, a current distance of the at least one of the vehicle or the agent from the region of potential collision may be determined. The current distance may be determined for at least the other of the vehicle or the agent that is predicted or expected to arrive in the region of potential collision after the one of the vehicle or the agent, as determined in step 308. In some examples, the current distance may be determined for each of the vehicle and the agent. As above, in at least some examples, a hysteresis may be employed to ensure consistency from time to time as the cost is determined. The current distance may be the actual distance of the vehicle or agent from a location in the region of potential collision. The current distance may be a distance along the path determined in step 302 or 304 for the agent or vehicle respectively. The current distance is determined for the same one of the vehicle or agent for which stopping distance is determined in step 310. Determination of the stopping distance or current distance is described in more detail below in relation to FIGS. 5A to 5C.

At step 314, the method 300 may comprise calculating a cost value based on the stopping and current distances. In some examples, a cost value may be calculated for each of the vehicle and the agent and/or some combination thereof (e.g., as a function of both distances to the collision region). The cost value may be determined based on a comparison of the stopping and current distances. A cost function may be determined or evaluated based on the stopping distance and current distance. The stopping distance may indicate a value of a weighting or variable of the cost function. The current distance may be compared to the cost function to determine a cost value at the particular time being considered. The cost value and cost functions are discussed in relation to FIG. 6 below.

At step 316, the vehicle may be controlled based on the cost value determined in step 314. The vehicle may be controlled to change its planned path, change its trajectory, decelerate, maintain a current velocity, perform another evasive action, and/or emit a warning. The vehicle may be controlled to continue on the same path, because the cost value may indicate that there is sufficient distance between the vehicle and the agent to avoid a potential collision should the worst-case action occur.

Figure 4:
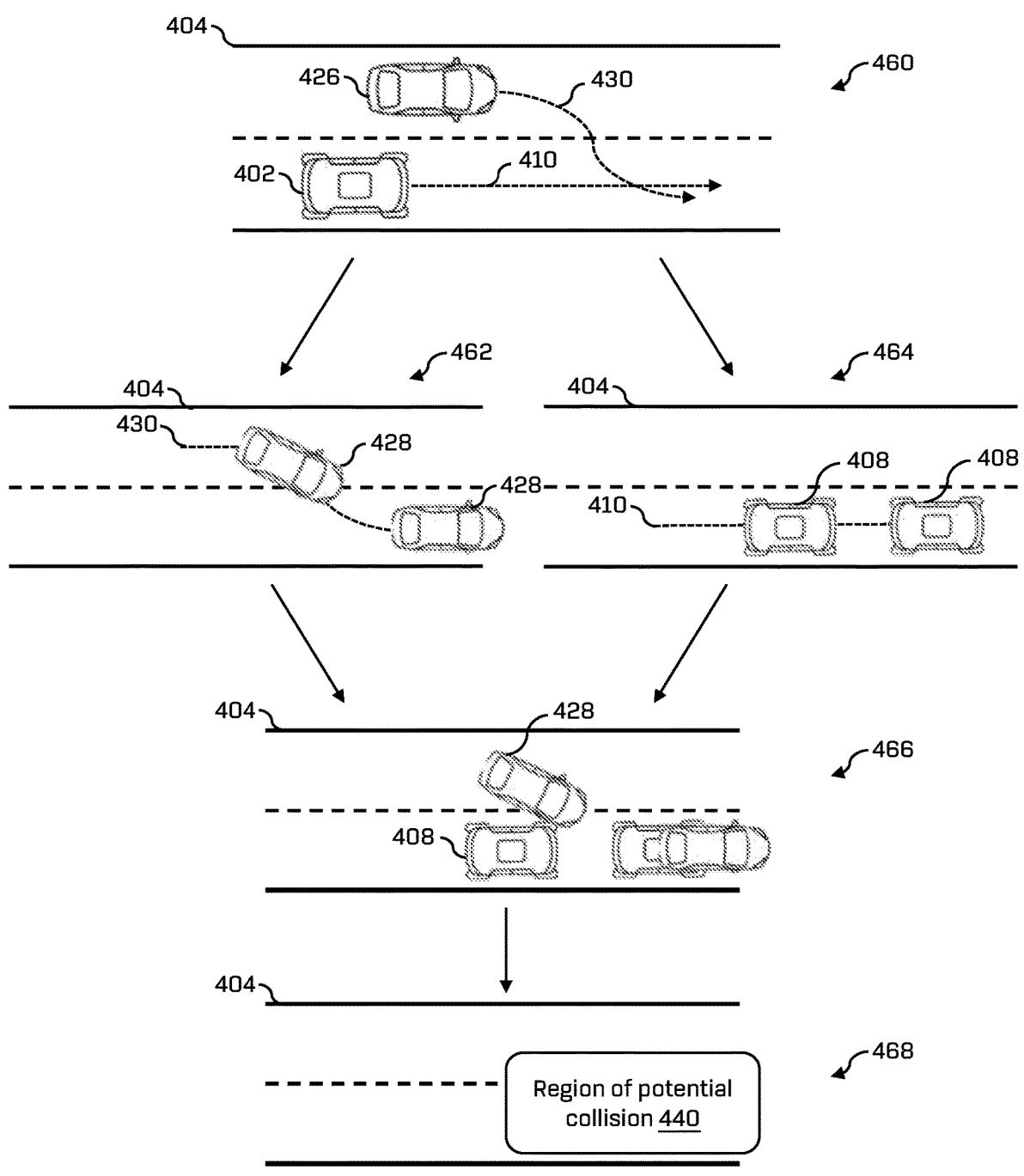
FIG. 4 is a pictorial diagram of a process for determining a region of potential collision according to the present invention.

FIG. 4 illustrates how the region of potential collision may be determined, as in step 306 of the method 300 in FIG. 3 or in box 132 of FIG. 1. FIG. 4 shows a pictorial representation of steps a vehicle computing device, such as device 116 or 204, may take to determine such a region. FIG. 4 shows a series of representations of a road 404 and a vehicle 402 and an agent 426 that are travelling on the road 404. The vehicle computing device may generate a representation or simulation of the environment including the vehicle and agent in order to determine the region of potential collision. The representation may be a 2D representation, as shown in FIG. 4, or may be a 3D representation. Of course, in additional or alternate examples, such simulations may be mathematical representations only without the need for a 2D or 3D simulation. In a first representation 460, the vehicle 402 and the agent 426 are represented, along with their respective paths 410 and 430. As in FIG. 1, the paths 410 and 430 may be determined by a vehicle computing system, and specifically by a planner and a prediction component respectively.

Having modelled or simulated the vehicle and agent and the environment in which they are travelling, the simulated vehicle 402 and agent 426 may be projected along the paths. An example of such a projection is shown in representations 462 and 464, in which outlines 408, 428 of the simulated vehicle 402 and agent 426 are depicted along the paths. Only two locations for each of the outlines 404, 428 are shown in these representations 462, 464 to preserve clarity. The projection may be performed for a plurality of positions along the path. The positions may be a predetermined distance apart. The outline may be a full outline of the vehicle or a partial outline of the vehicle. For example, a partial outline may comprise two or more lines representing a dimension of the vehicle. Projecting a partial outline may provide benefits in the speed and efficiency of the computation.

As shown in representation 466, the projections may be compared to determine one or more locations at which the outlines 408, 428 touch, overlap, or are within a predetermined distance of one another. Two such locations are shown in representation 466, with a first location being a point of first contact, where the outlines first touch along the paths and the second location being a final point of overlap along the paths. A plurality of overlapping positions may be determined.

Based on the points of touching or overlap or of close proximity, the region of potential collision may be determined. The region of potential collision 440, as shown in representation 468, may be determined to encompass the locations at which the outlines overlap, touch, or are in close proximity. The region may be determined based on a first location and a final location of overlap etc. The region may have a predetermined shape. For example, as shown in FIG. 4, the region may be substantially rectangular. The region may be determined so as to include a buffer or border to account for positional uncertainty. That is, the region may be determined so that the location of overlap, touch, or close proximity determined based on the outlines are all within the boundary of the region by at least a predetermined distance.

While FIG. 4 illustrates projecting the same representations of the vehicle and agent along their respective paths, in some examples the representations of the vehicle and agent may differ along the paths. In these examples, the vehicle and/or agent may be represented by a region that expands with increasing distance along the path. Increasing the region representing the vehicle and/or agent may account for uncertainty in one or both of the paths. The uncertainty may be a temporal or a positional uncertainty.

Figure 5A:
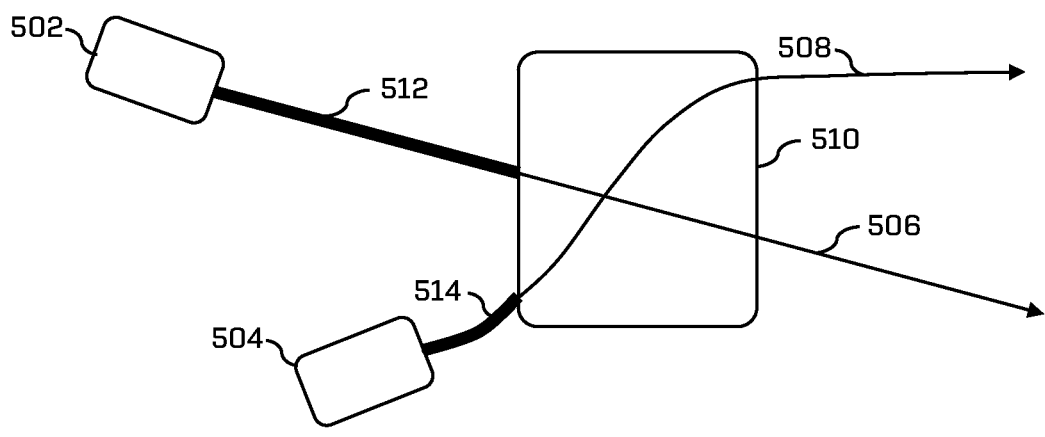
FIGS. 5A to 5C are schematic diagrams depicting different stages of interaction between two vehicles according to the present invention.
Figure 5B:
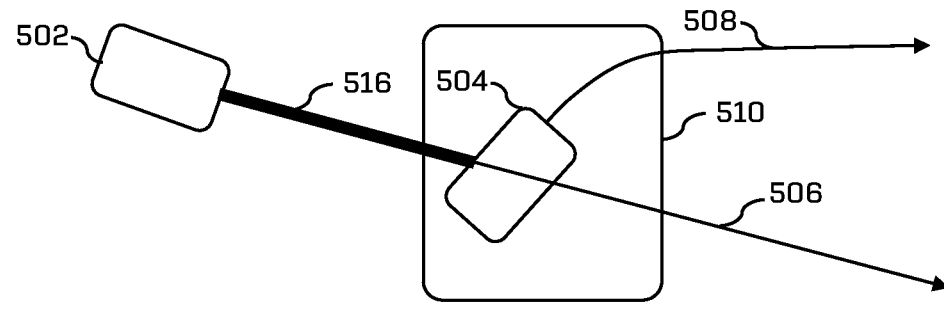
Figure 5C:
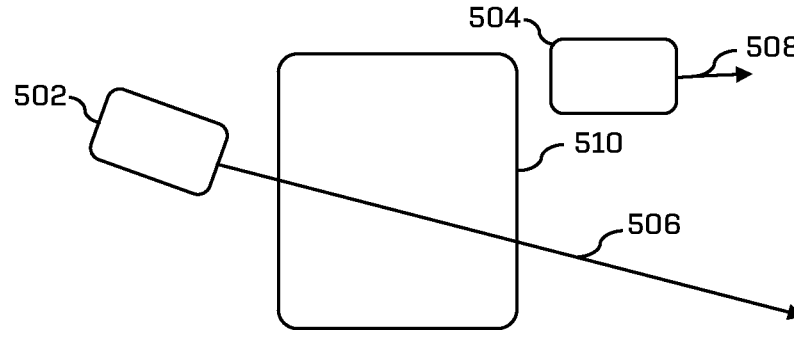

FIGS. 5A to 5C illustrate how the stopping distance and current distance may be determined based on a region of potential collision and the relative positions of the vehicle and agent. To demonstrate this, each of FIG. 5A to 5C illustrate a first vehicle 502 and a second vehicle 504. As will described below, one of the first and second vehicles 502, 504 may correspond to an agent as described above in relation to other examples, and the other of the first and second vehicles 502, 504 may correspond to a vehicle.

In FIG. 5A, the first and second vehicles 502, 504 are shown at a first point in time, while FIGS. 5B and 5C show the vehicles 502, 504 at second and third points in time respectively. The first vehicle 502 is travelling along a first path 506, and the second vehicle 504 is travelling along a second path 508. In FIG. 5A, the first path 506 and the second path 508 cross and a region of potential collision 510 has been determined around the point at which the paths cross. This region 510 may have been determined using techniques described in relation to FIG. 4, for example.

The stopping distance and current distance may be determined. The stopping distance and current distance may be determined based on which of the first and second vehicles 502, 504 is expected to arrive at the region 510 first. In some examples, the stopping distance for each of vehicle 502, 504 may be determined and the current distance may be determined based on which of the first and second vehicles 502, 504 is in or is expected to arrive at the region 510 first.

Therefore, the cost value may also be determined based on which of the vehicles 502, 504 is in or is expected to arrive at the region 510 first.

Which of the first and second vehicles 502, 504 is expected to arrive at the region 510 first may be determined based at least partially on at least one of a current velocity, a current acceleration, a predicted velocity, a predicted acceleration, or a predicted or expected trajectory of each vehicle. If the first vehicle 502 is predicted to arrive at the region 510 first, then the current distance and cost value, and in some examples the stopping distance, may be determined for the second vehicle 504. Conversely, if the second vehicle 504 is predicted to arrive at the region 510 first, then the current distance and cost value, and in some examples the stopping distance may be determined for the first vehicle 502. Generally, therefore, the other of the two vehicles to the one vehicle arriving first is used to determine the cost value. This is because it is the vehicle arriving first that may perform the worst-case action, so it may be determined for the other vehicle whether there will be sufficient stopping distance and the vehicle can be controlled accordingly.

In FIG. 5A, because both vehicles 502, 504 are currently outside of the region 510, the stopping distance and current distances, labelled as portions 512 and 514 of the paths 506 and 508 respectively, are determined relative to locations on an edge of the region 510. These may be based on the paths, so that the location on the edge of the region 510 is where the path first intersects with the region 510. In other words, the current distance for the first vehicle 502 may be a distance along the first path 506 to a location where the first path 506 intersects with the region 510. The stopping distance may also be determined based on the first path and the location where the first path 506 intersects with the region 510.

The stopping distance may be determined using the equation:

$$x = \frac{v^2}{2a_{max}} + d$$

where x is the stopping distance from the location, v is the velocity of the vehicle, $a_{max}$ is the maximum deceleration of the vehicle, and d is an adjustment value to account for reaction time.

In FIG. 5B, the first and second vehicles 502, 504 have moved along their respective paths 506, 508. The second vehicle 504 has entered the region 510. When one vehicle is in the region, the stopping distance and current distance may be determined for the other of the vehicles. Accordingly, as shown in FIG. 5, the stopping and current distances, labelled as portion 516, may be determined for the first vehicle 502. Because the position of the second vehicle 504 within the region 510 is now known, there may be less positional uncertainty relating to where the worst-case action may be performed. Therefore, rather than determining the stopping distance and current distance based on an edge of the region, these distances may be determined relative to a location occupied by the second vehicle 504. This location may be an edge of the second vehicle 504, as shown in FIG. 5B, or a center point of the second vehicle 504. The location may be determined based on a projection of the first vehicle 502 along its path 506. The location may be determined by determining where the second vehicle 504 may stop within the region 510 based on its current position, current velocity, and a deceleration value. A position of the second vehicle

504 as stopped may be determined using the equation described above, with x representing the distance from the current position in this case.

In FIG. 5C, the second vehicle 504 has exited the region 510. No determination of stopping or current distances are made in this situation because there is no longer a risk of potential collision between the two vehicles 502, 504. In such an example, the paths of the vehicles 502, 504 no longer overlap, so a collision region may not be determined. The collision region is depicted in FIG. 5C to show the relative positions of the vehicles.

Figure 6:
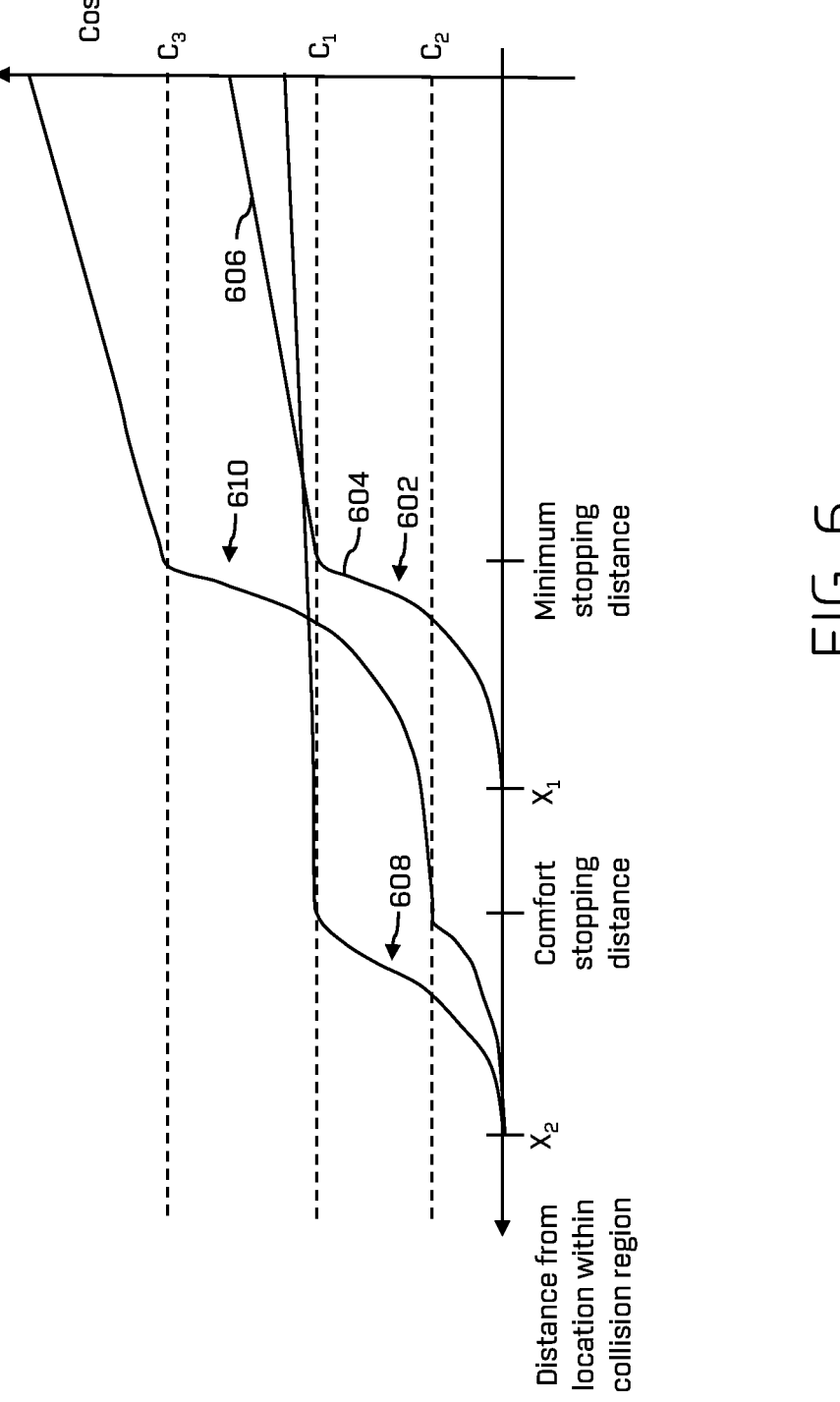
FIG. 6 is a chart illustrating a cost function for controlling a vehicle during an interaction according to the present invention.

FIG. 6 shows an example chart of a cost function that may be used to determine a cost value based on stopping distances and a current distance of a vehicle or agent. In FIG. 6, the x-axis represents distance to a location in the region of potential collision, with decreasing distance towards the right-hand side, while the y-axis represents cost. As described above, the distance may be determined for the agent or for the vehicle depending on a region of potential collision and which of the vehicle or agent is expected to enter the region first.

In FIG. 6, a first cost function 602 is shown. Generally, a cost function may be determined based on a minimum or 'safe' stopping distance. Such a cost function may be referred to as a safe stop cost function. A minimum or 'safe' stopping distance, as described above, may represent a distance at which a vehicle or agent can stop before reaching a location in the region of potential collision based on a maximum deceleration. The minimum stopping distance may also be determined to incorporate at least a reaction time. The minimum stopping distance may be determined based on a current velocity, the reaction time, and a maximum deceleration. In FIG. 6, the first cost function 602 is based on a minimum stopping distance. As can be seen in FIG. 6, function 602 has a portion 604 that increases from a cost value of zero at a distance $X_1$ before the minimum stopping distance to a cost value of $C_1$ at the minimum stopping distance. The portion 604 may be defined by a quadratic function. Using a quadratic function in advance of the minimum stopping distance may be useful when distances approaching the minimum stopping distance are considered undesirable. After the minimum stopping distance is reached, the cost function 602 has a second portion 606 that rises linearly from a cost value of $C_1$ to a final value at the location in the region of potential collision. In some examples, the second portion 606 may be flat between the minimum stopping distance and the region. Increasing cost values may be considered to indicate an increasing likelihood of collision. Accordingly, the vehicle may act to reduce the cost value wherever possible.

FIG. 6 also shows a second cost function 608. The second cost function 608 may be determined based on a 'comfort' stopping distance, and may therefore be referred to as a comfort stop cost function. A comfort stopping distance may represent a distance at which a vehicle or agent can stop before a location in the region of potential collision based on a rate of deceleration that is less than the maximum deceleration. The rate of deceleration for the comfort stopping distance may be a comfortable deceleration rate for the vehicle and/or the passengers of the vehicle. The comfortable deceleration rate may be a normal deceleration rate. The second cost function 608 may have a similar shape to the first cost function 602. In other words, the second cost function 608 rises quadratically from a cost value of zero at a distance $X_2$ before the comfort stop distance to a value of $C_1$ at the comfort stop distance, before rising linearly until the collision region.

Generally, a cost function may therefore be described to have a quadratic portion and a linear portion. The quadratic portion may be before a stopping distance and the linear portion may be after the stopping distance.

FIG. 6 also shows a third cost function 610. Generally, a first and second cost function, such as first cost function 602 and second cost function 608 may be combined to generate a third cost function, such as cost function 610. The third cost function 610 may be based on two stopping distances, which in turn are based on a maximum and less-than-maximum deceleration. The cost functions may ensure that the vehicle maintains an appropriate distance between it and the agent, so that the potential for a collision is largely reduced. Such a combined cost function may prevent unwanted behaviors from an autonomous vehicle such as tailgating or cutting in front of an agent so that the agent has to decelerate. The third cost function 610 may be an average of the first and second cost functions 602, 608. Accordingly the third cost function 610 rises quadratically from zero at the distance $X_2$ to a cost value of $C_2$, which is less than $C_1$, at the comfort stopping distance. The third cost function 610 then rises between the comfort stopping distance and the minimum stopping distance to a value of $C_3$, which is higher than $C_2$ and $C_1$.

In some examples, a combined cost function, such as the third cost function 610, may be a weighted combination of two or more other stop functions. The weighting may be based, at least in part, on a direction of travel of the vehicle relative to the object. For example, the weighting may be higher for scenarios where the vehicles are travelling towards one another rather than following one another.

Figure 7:
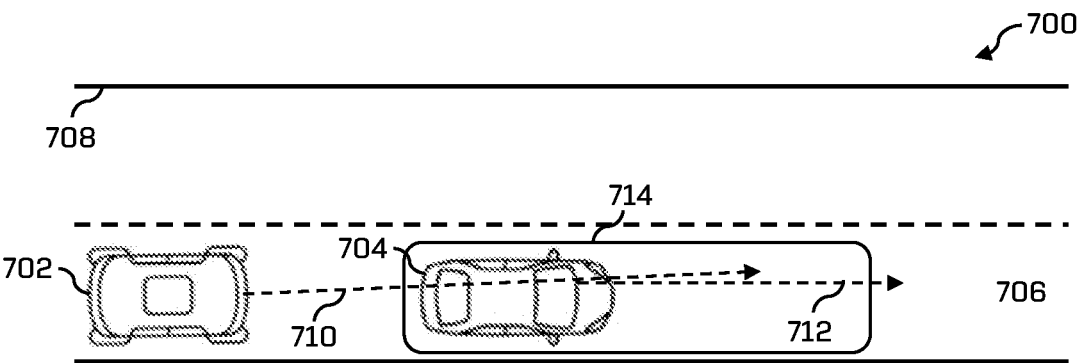
FIG. 7 is a diagram of an example interaction in which a vehicle is following an agent vehicle.

FIGS. 7 to 9B describe particular scenarios in which the above techniques may be applied. FIG. 7 shows a particular scenario 700 in which a vehicle 702 and an agent 704 are in the same lane 706 of a road 708. The vehicle 702 is following the agent 704. The vehicle 702 may have an expected first path 710 that overlaps with the agent 704 and part of a predicted second path 712 for the agent 704. Accordingly, a region of potential collision 714 may be determined around the agent based on the paths 710, 712. The region of potential collision 714 may therefore be considered to account for a worst-case action of the agent 704 decelerating at a maximum rate. The vehicle 702 may therefore be controlled to increase the distance between it and the agent 704 by decelerating or by not accelerating when the agent 704 accelerates. The vehicle 702 may be controlled to change lanes, if possible, so that its path is no longer aligned with the path of the agent 704. Deceleration and changing lanes may be performed if it is safe to do so. These techniques may also be applied in similar situations such as where a vehicle such as vehicle 702 is merging into a lane behind an agent such as agent 704 or where an agent is merging into a lane in front of a vehicle.

Figure 8:
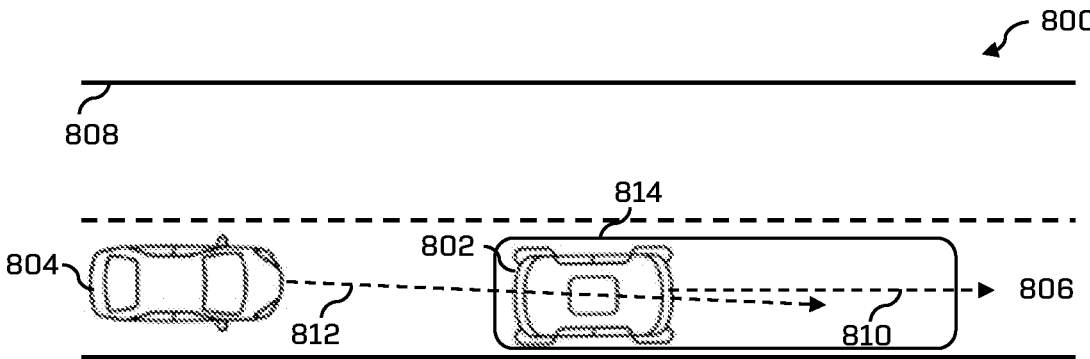
FIG. 8 is a diagram of an example interaction in which an agent vehicle is approaching a vehicle from the rear.

FIG. 8 shows a scenario 800 in which a vehicle 802 and an agent 804 are in the same lane 806 of a road 808. The agent 804 is following the vehicle 802. The agent 804 may have a predicted second path 812 that overlaps with the vehicle 802 and part of a first path 810 for the vehicle 802. Accordingly, a region of potential collision 814 may be determined around the vehicle based on the paths 810, 812. The region of potential collision 814 may therefore be considered to account for a worst-case action of the vehicle 802 decelerating at a maximum rate. The vehicle 802 may be controlled to increase the distance between it and the agent 804. The vehicle 802 may be controlled to accelerate to increase the distance or to change lanes so that the paths 810, 812 do not overlap. Acceleration and lane changing may be performed if it is safe to do so. During any of the scenarios described herein, and/or during implementation of any of the techniques described herein, the operation of the vehicle is constrained by or reconciled against policy constraints and rules of the road, such as speed limits and lane restrictions. These techniques may also be applied in similar situations such as where a vehicle such as vehicle 802 is merging into a lane in front of an agent such as agent 804 or where an agent is merging into a lane behind a vehicle.

In the scenario of FIG. 8, the agent 804 may be expected to yield to the vehicle 802. In some examples, such as where the agent 804 approaches the vehicle 802 from the rear, the vehicle 802 may be controlled to maintain its path rather than perform evasive action or to increase the distance between it and the agent. To do this, the agent 804 may be discounted if particular criteria are met, so that a cost value associated with the agent is not determined. This may be achieved by applying filtering to agents having particular driving parameters, such as where an agent is accelerating towards the vehicle from the rear, where the agent is behind the vehicle and maintaining a particular velocity and position, or where the agent merges into the lane in which the vehicle is travelling behind the vehicle.

Figure 9A:
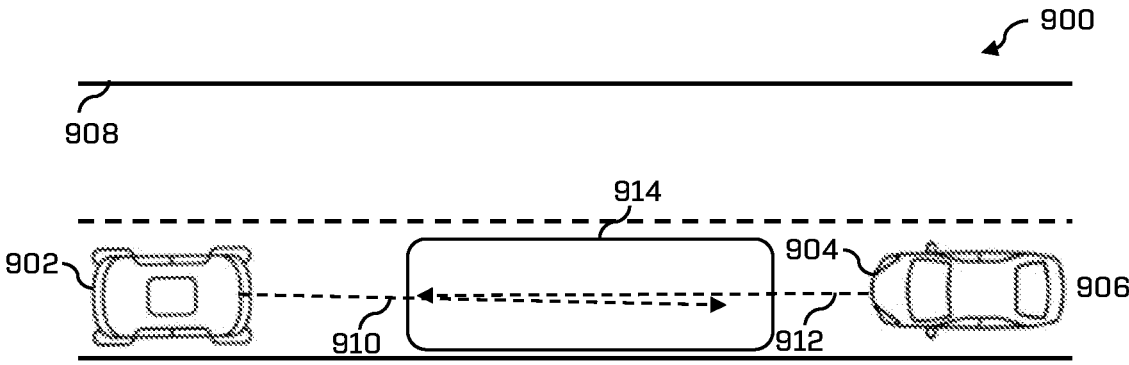
FIGS. 9A and 9B are diagrams of an example interaction in which an agent vehicle is oncoming to a vehicle.

FIG. 9A shows a scenario 900 in which a vehicle 902 and an agent 904 are in the same lane 906 of a road 908. The vehicle 902 is travelling along the road 908 in a first direction, while the agent 904 is travelling along the road 908 in a second direction that is opposite to the first direction. The agent 904 may be said to be oncoming to the vehicle 902 or to be travelling towards the vehicle 902 head on. The agent 904 may have a predicted second path 912 that overlaps with part of a first path 910 for the vehicle 902. Accordingly, a region of potential collision 914 may be determined between the vehicle 902 and the agent 904 based on the paths 910, 912.

In the scenario depicted in FIG. 9A, the region of potential collision 914 may be considered to account for a worst-case action of the agent 904 continuing straight towards the vehicle 902 as the vehicle 902 travels along the road 908. This may be in contrast to other scenarios where the vehicle and agent are not oncoming to one another, where the worst-case action is a sudden stop. Scenarios involving oncoming vehicles and agents may be determined using a heading of the vehicle and agent. A heading may comprise a direction of travel or the first or second paths. A vehicle and agent may be considered oncoming if their headings are around 180 degrees apart. A threshold may be set for headings to be oncoming, such as ±10 degrees or ±15 degrees from being 180 degrees apart, i.e., headings from 170 degrees to 190 degrees apart or from 165 to 195 degrees apart may be considered to be oncoming. In some examples, the region of potential collision 914 may be determined based on relative directions of travel of the vehicle 902 and agent 904 and/or how aligned the vehicles are. In some examples, the region 914 may be determined based on the worst-case action or based on determining that the headings indicate that the vehicle and agent are heading towards one another.

Because the vehicle 902 and agent 904 are oncoming relative to one another, the location from which the stopping distance and current distance are determined may differ. The stopping and current distances may be determined for the vehicle 902 to ensure that the vehicle 902 is able to stop given a worst-case action by the agent 904, which may be to continue forward toward the vehicle 902. The location from which the stopping distance and current distance are determined may be based on the paths 910, 912. Specifically, the location may be determined based on a last predicted position of the agent 904 within the region of potential collision 914. This may be a point at which the agent 904 exits the region 914. In some examples, the location may be the closest point on the region 914 to the vehicle 902.

Figure 9B:
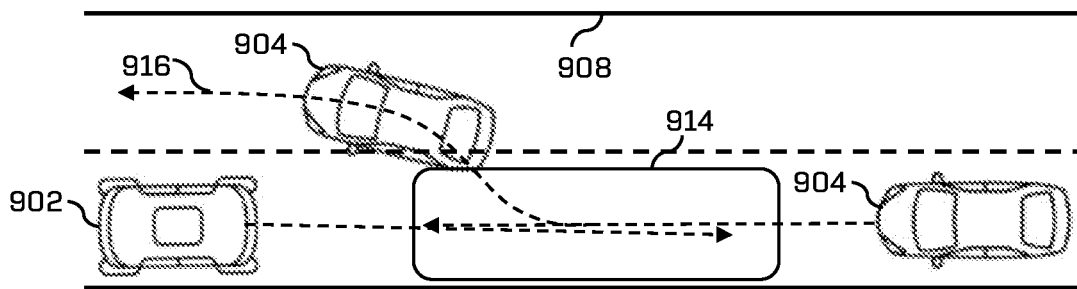

In some examples, the stopping distance and current distance may be based on where the agent 904 would be able to swerve out of the way of the vehicle 902. Such an example is illustrated in FIG. 9B. In this example, a lateral velocity at which the agent 904 may swerve may be determined. The lateral velocity may be a worst-case lateral velocity. Based on the agent 904 travelling at the lateral velocity, it may be determined where the agent 904 will exit the region 914 and therefore avoid being oncoming with the vehicle 902. In the example shown in FIG. 9B, this is shown by path 916. The path 916 illustrates how the agent may return to its lane so that it is no longer heading towards the vehicle.

The stopping distance, current distance, and therefore a cost value may be determined for each of the agent 904 and the vehicle 902 based on the region 914. The determination of these values for both the agent and the vehicle may be based on the alignment of the vehicles. Which of the cost values is used to control the vehicle may be based on which of the vehicle or agent is expected to reach the region 914 first. In some examples, both cost values may be used to control the vehicle.

Based on stopping distances and current distances calculated for these locations, the vehicle 902 may be controlled. Particularly, the vehicle 902 may be controlled to ensure that it stops in advance of the location determined within the region of potential collision 914 so that the agent 904 is able to change its course or to stop without a risk of collision.

EXAMPLE CLAUSES

A: A system comprising: one or more processors; and non-transitory memory storing processor-executable instructions that, when executed by the one or more processors, cause the system to perform actions including: receiving, from a planning component of an autonomous vehicle traversing an environment, a first trajectory that the autonomous vehicle is being controlled to follow; receiving, from a prediction component of the autonomous vehicle, a second trajectory that an object is predicted to follow; determining, based on a first projection of the autonomous vehicle along a path of the first trajectory and a second projection of the object along a path of the second trajectory, an area where the autonomous vehicle and the object have a possibility of collision, the area including at least one location at which the first projection touches or partially overlaps the second projections; determining, based at least in part on at least one predetermined autonomous vehicle deceleration rate, at least one threshold distance to a first position within the area for the autonomous vehicle to stop before the first position; determining, based at least in part on at least one predetermined object deceleration rate, at least one threshold distance to a second position within the area for the object to stop before the second position; determining, based at least in part on the first trajectory and the second trajectory, which of the object or the autonomous vehicle will reach the area first, and for at least the other of the object or the autonomous vehicle: determining, based at least in part on the at least one threshold distance for the autonomous vehicle or the object, a cost function; determining a current distance of the autonomous vehicle or the object from the first position or second position; determining a cost value based on a value of the cost function at the current distance; and controlling the autonomous vehicle based on the cost value.

B: a system as clause A describes, wherein the area where the autonomous vehicle and the object have a possibility of collision is determined based at least in part on a worst-case action that the autonomous vehicle or the object is able to perform, the worst-case action comprising one of: the autonomous vehicle stopping in the path of the object; the object stopping in the path of the vehicle; or the object continuing along its path towards the autonomous vehicle.

C: a system as clause A or clause B describes, wherein the cost function comprises at least one of a safe stop cost function or a comfort stop cost function, wherein for the safe stop cost function, the predetermined autonomous vehicle deceleration rate comprises a maximum autonomous vehicle deceleration rate and the predetermined object deceleration rate comprises a maximum object deceleration rate, and wherein for the comfort stop cost function, the predetermined autonomous vehicle deceleration rate comprises a comfort autonomous vehicle deceleration rate that is less than the maximum autonomous vehicle deceleration rate and the predetermined object deceleration rate comprises comfort object deceleration rate that is less than the maximum object deceleration rate.

D: a system as clause C describes, wherein the cost function comprises a sum or an average of at least a safe stop cost function and a comfort stop cost function.

E: a system as any of clauses A to D describe, wherein the autonomous vehicle is controlled to perform actions to reduce the cost value, and wherein the one or more actions comprise at least one of decelerating to increase the current distance, maintaining a velocity to increase the current distance, determining a third path to follow in preference to the first path, or emitting a warning to the object.

F: a method comprising: determining, for a vehicle traversing an environment, a first path along which the vehicle is predicted to travel; determining, for an object traversing the environment, a second path along which the object is predicted to travel; determining a region of potential collision between the vehicle and the object based at least in part on the first path and the second path; determining that one of the vehicle or the object is in or will be in the region of potential collision first; determining a stopping distance for at least the other of the vehicle or the object from a location in the region of potential collision; determining a current distance of at least said other of the vehicle or the object from the location in the region of potential collision; calculating a cost value based at least in part on the stopping distance and the current distance; and controlling the vehicle based at least in part on the cost value.

G: a method as clause F describes, comprising: determining a first stopping distance for the vehicle and a second stopping distance for the object; and at least one of: selecting the first stopping distance for use in determining the cost value, based at least in part on determining that the object is in or will be in the region of potential collision first; or selecting the second stopping distance for use in determining the cost value, based at least in part on determining that the vehicle is in or will be in the region of potential collision first.

H: a method as clause F or clause G describe, comprising: determining a first position of the vehicle along the first path that is within a predefined distance to a first position of the object along the second path, wherein the region of potential collision is determined based at least in part on the first positions.

I: a method as any of clauses F to H describe, wherein the region of potential collision is determined based at least in part on a predicted worst-case action by the one of the vehicle or the object.

J: a method as clause I describes, wherein the predicted worst-case action comprises at least one of: said one of the vehicle or the object stopping in the region of potential collision; or the object driving towards the vehicle at its current velocity.

K: a method as any of clauses F to J describe, wherein the stopping distance and the current distance are determined based at least in part on determining that said one of the vehicle or the object will be in the region first, and wherein the stopping distance and current distance are determined from a location on an edge of the region of potential collision.

L: a method as any of clauses F to K describe, wherein the stopping distance and the current distance are determined based at least in part on determining that said one of the vehicle or the object is in the region first, and wherein the stopping distance and the current distance are determined from a location occupied by the other of the vehicle or the object.

M: a method as any of clauses F to L describe, comprising: calculating a value indicating alignment of the vehicle and object based at least in part on the first path and the second path, wherein the cost value is determined based at least in part on the value.

N: a method as any of clauses F to M describe, wherein the vehicle is controlled to perform at least one of the following actions based at least in part on the cost value: decelerate to increase the current distance; maintain a current velocity; stop at a position on the first path before the region of potential collision; emit a warning signal to the object; or follow a third path having a lower cost value.

O: a method as any of clauses F to N describe, comprising: determining a cost function based at least in part on the stopping distance, wherein the cost value is determined based on the cost function and the current distance. and wherein the cost function comprises one or more of: a safe stop cost function based on the stopping distance being a safe stopping distance associated with a maximum deceleration of the other of the vehicle or object; or a comfort stop cost function based on the stopping distance being a comfort stopping distance associated with a deceleration of the other of the vehicle or object that is less than the maximum deceleration.

P: a method as clause O describes, wherein the cost function comprises a combination of the safe stop and comfort stop cost functions.

Q: a method as clause P describes, wherein the cost function is a weighted combination of the safe stop and comfort stop cost functions, wherein the weighting is based at least in part on a direction of travel of the vehicle relative to the object.

R: a method as any of clauses O to Q describe, wherein the cost function comprises a linear portion and a quadratic portion.

S: a method as any of clauses F to R describe, wherein the stopping distance and current distance are determined for the object, and are based on a reaction time for the object.

T: a system comprising: one or more processors; and non-transitory memory storing processor-executable instructions that, when executed by the one or more processors, cause the system to perform actions as described by the method of any of clauses F to S.

U: One or more non-transitory computer-readable media storing instructions executable by one or more processors, wherein the instructions, when executed, cause the one or more processors to perform operations as described by the method of any of clauses F to S.

While the example clauses described above are described with respect to one particular implementation, it should be understood that, in the context of this document, the content of the example clauses can also be implemented via a method, device, system, computer-readable medium, and/or another implementation. Additionally, any of examples A-U may be implemented alone or in combination with any other one or more of the examples A-U.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might." unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X. Y or Z." unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:

determining, for a vehicle traversing an environment, a first path along which the vehicle is predicted to travel, the first path associated with a lane change maneuver from a first lane to a second lane;

determining, for an object traversing the environment, a second path along which the object is predicted to travel, the object comprising a further vehicle, the second path associated with the second lane, wherein after the lane change maneuver the vehicle is predicted to travel in the second lane ahead of the object;

determining a region of potential collision between the vehicle and the object based at least in part on the first path and the second path;

determining that the vehicle is in or will be in the region of potential collision first; and based at least in part on determining that the vehicle is or will be in the region of potential collision first:

determining a stopping distance for at least the object from a location in the region of potential collision;

determining a current distance of at least the object from the location in the region of potential collision;

calculating a cost value based at least in part on the stopping distance and the current distance; and controlling movement of the vehicle based at least in part on the cost value.

2. The method of claim 1, comprising:

determining a first position of the vehicle along the first path that is within a predefined distance to a first position of the object along the second path, wherein the region of potential collision is determined based at least in part on the first positions.

3. The method of claim 1, wherein the region of potential collision is determined based at least in part on a predicted worst-case action by the one of the vehicle or the object.

4. The method of claim 3, wherein the predicted worst-case action comprises at least one of:

the vehicle or the object stopping in the region of potential collision; or the object driving towards the vehicle at its current velocity.

5. The method of claim 1, wherein the stopping distance and the current distance are determined based at least in part on determining that the vehicle will be in the region first, and wherein the stopping distance and current distance are determined from a location on an edge of the region of potential collision.

6. The method of claim 1, wherein the stopping distance and the current distance are determined based at least in part on determining that the vehicle is in the region first, and wherein the stopping distance and the current distance are determined from a location occupied by the object.

7. The method of claim 1, comprising:

calculating a value indicating alignment of the vehicle and object based at least in part on the first path and the second path, wherein the cost value is determined based at least in part on the value.

8. One or more non-transitory computer-readable media storing instructions executable by one or more processors, wherein the instructions, when executed, cause the one or more processors to perform operations comprising:

determining, for a vehicle traversing an environment, a first path along which the vehicle is predicted to travel;

determining, for an object traversing the environment, a second path along which the object is predicted to travel, the object comprising a further vehicle, the first path and second path associated with travel in a same lane direction, wherein the vehicle is predicted to be in front of the object with respect to the lane direction;

determining a region of potential collision between the vehicle and the object based at least in part on the first path and the second path;

determining that the vehicle is in or will be in the region of potential collision first; and based at least in part on determining that the vehicle is or will be in the region of potential collision first:

determining a stopping distance for at least the object from a location in the region of potential collision;

determining a current distance of at least the object from the location in the region of potential collision;

calculating a cost value based at least in part on the stopping distance and the current distance; and controlling movement of the vehicle based at least in part on the cost value.

9. The computer-readable media of claim 8, wherein the vehicle is controlled to perform at least one of the following actions based at least in part on the cost value:

decelerate to increase the current distance;

maintain a current velocity;

stop at a position on the first path before the region of potential collision;

emit a warning signal to the object; or follow a third path having a lower cost value.

10. The computer-readable media of claim 8, wherein the instructions, when executed, cause the one or more processors to perform operations comprising:

determining a cost function based at least in part on the stopping distance, wherein the cost value is determined based on the cost function and the current distance and wherein the cost function comprises one or more of:

a safe stop cost function based on the stopping distance being a safe stopping distance associated with a maximum deceleration of the other of the vehicle or object; or a comfort stop cost function based on the stopping distance being a comfort stopping distance associated with a deceleration of the other of the vehicle or object that is less than the maximum deceleration.

11. The computer-readable media of claim 10, wherein the cost function comprises a combination of the safe stop and comfort stop cost functions.

12. The computer-readable media of claim 11, wherein the cost function is a weighted combination of the safe stop and comfort stop cost functions, wherein the weighting is based at least in part on a direction of travel of the vehicle relative to the object.

13. The computer-readable media of claim 10, wherein the cost function comprises a linear portion and a quadratic portion.

14. The computer-readable media of claim 8, wherein the stopping distance and current distance are determined for the object, and are based on a reaction time for the object.

* * * * *